(12) United States Patent
Burns

(10) Patent No.: US 9,470,445 B2
(45) Date of Patent: Oct. 18, 2016

(54) HEAD PRESSURE CONTROL

(71) Applicant: EMERSON CLIMATE TECHNOLOGIES, INC., Sidney, OH (US)

(72) Inventor: Nathan Paul Burns, Troy, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 232 days.

(21) Appl. No.: 14/535,392

(22) Filed: Nov. 7, 2014

(65) Prior Publication Data
US 2016/0131405 A1  May 12, 2016

(51) Int. Cl.
F25B 1/00 (2006.01)
F25B 49/02 (2006.01)

(52) U.S. Cl.
CPC .......... *F25B 49/027* (2013.01); *F25B 2600/01* (2013.01); *F25B 2600/0251* (2013.01); *F25B 2600/0253* (2013.01); *F25B 2600/111* (2013.01); *F25B 2600/17* (2013.01); *F25B 2600/2513* (2013.01); *F25B 2700/195* (2013.01); *F25B 2700/197* (2013.01); *F25B 2700/2116* (2013.01); *F25B 2700/2117* (2013.01)

(58) Field of Classification Search
CPC ............ F25B 49/005; F25B 2500/222; F25B 41/062; F25B 49/022; F25B 1/10; F25B 13/00
USPC .......................... 62/115, 117, 129, 196.4, 498
See application file for complete search history.

(56) References Cited

U.S. PATENT DOCUMENTS

| | | | | |
|---|---|---|---|---|
| 4,677,830 A * | 7/1987 | Sumikawa | ............ | B60H 1/3225 62/126 |
| 5,457,965 A * | 10/1995 | Blair | ..................... | F25B 49/005 62/129 |
| 6,463,747 B1 * | 10/2002 | Temple | ................... | F24F 11/008 62/126 |
| 6,571,566 B1 * | 6/2003 | Temple | ................. | F25B 49/005 62/127 |
| 7,891,201 B1 * | 2/2011 | Bush | ........................ | F25B 1/10 62/115 |
| 2008/0077260 A1 * | 3/2008 | Porter | ................... | F25B 49/005 62/129 |
| 2011/0100040 A1 | 5/2011 | Bush et al. | | |
| 2011/0138825 A1 | 6/2011 | Chen et al. | | |
| 2011/0239668 A1 | 10/2011 | Qiao et al. | | |
| 2012/0017466 A1 | 1/2012 | Beers et al. | | |

OTHER PUBLICATIONS

International Search Report regarding International Application No. PCT/US2015/058080, dated Jan. 27, 2016.
Written Opinion of the International Searching Authority regarding International Application No. PCT/US2015/058080, dated Jan. 27, 2016.

* cited by examiner

*Primary Examiner* — Melvin Jones
(74) *Attorney, Agent, or Firm* — Harness, Dickey & Pierce, P.L.C.

(57) ABSTRACT

A head pressure control system may control a high side operating condition of a vapor compression system. The head pressure control system includes a vapor compression system having a compressor, condenser, expansion valve, and evaporator. The head pressure control system may also include a high side condition sensor, a low side condition sensor, a controller, and a control device. The low side condition sensor may measure and communicate a low side operating condition to the controller. The high side condition sensor may measure and communicate a high side operating condition to the controller. The controller may compare a theoretical high side operating condition to the high side operating condition, and determine a control output. The controller may communicate the control output to a control device, which may influence the high side operating condition based on the control output.

25 Claims, 10 Drawing Sheets

HEAD PRESSURE CONTROL

FIELD

The disclosure is directed to a method and system for controlling the high side operating conditions of a vapor compression process.

BACKGROUND

This section provides background information related to the present disclosure and is not necessarily prior art. Vapor compression is widely used in commercial and consumer refrigeration and HVAC applications. Vapor compression processes take advantage of the thermodynamic properties of refrigerant-type working fluids to heat or cool a space. In a typical cooling application, the vapor compression process evaporates a refrigerant working fluid from a liquid state to a vapor state at constant temperature and pressure. The change in phase requires the absorption of heat and the system draws that heat out of the space to be cooled and transfers the heat to the working fluid. The vapor state working fluid is compressed back to a higher pressure and condensed back into the liquid phase, releasing a latent heat of vaporization to a heat sink such as the atmosphere or a heat exchanger. A typical vapor compression system includes a refrigerant compressor, a condenser, an expansion valve, and an evaporator.

SUMMARY

The present disclosure is directed to a head pressure control system for controlling a high side operating condition of a vapor compression system. The head pressure control system may include a vapor compression system having a compressor, condenser, expansion valve, and evaporator. The head pressure control system may also include a high side condition sensor disposed in a high side of the vapor compression system, a low side condition sensor disposed in a low side of the vapor compression system, a controller, and a control device. The low side condition sensor may measure a low side operating condition and communicate the low side operating condition to the controller via a network. The high side condition sensor may measure a high side operating condition and communication the high side operating condition to the controller via the network. The controller may receive the high and low side operating conditions, determine a theoretical high side operating condition, compare the theoretical high side operating condition to the high side operating condition, and determine a control output. The controller may communicate the control output to a control device via the network, and the control device may influence the high side operating condition based on the control output. The theoretical high side operating condition may be substantially similar to a minimum high side operating condition corresponding to a given low side operating condition.

BRIEF DESCRIPTION OF THE DRAWINGS

The foregoing and other features of the present disclosure will become more fully apparent from the following drawings. Understanding that these drawings depict only several embodiments in accordance with the disclosure and, therefore, are not to be considered limiting of its scope, the disclosure will be described with additional specificity and detail through the use of the accompanying drawings.

DETAILED DESCRIPTION

A vapor compression system for cooling a space operates by compressing a vapor phase working fluid to an elevated pressure, condensing the working fluid to a liquid phase at a constant saturation temperature and pressure, passing the liquid phase working fluid through an expansion valve to decrease the pressure, and evaporating the working fluid back to the vapor phase. Cooling of the space results from the evaporation process, which draws heat out of the space being cooled to provide a latent heat of vaporization necessary to complete the phase change from a liquid to a vapor. A typical vapor compression system may include, but might not be limited to, a compressor, condenser, expansion valve, and an evaporator. To aid in functionality, vapor compression systems may have a pressure differential between the high side of the expansion valve and the low side of the expansion valve that is greater than a minimum pressure differential. This pressure difference may ensure that vapor phase working fluid does not pass through the expansion valve.

Figure 3:
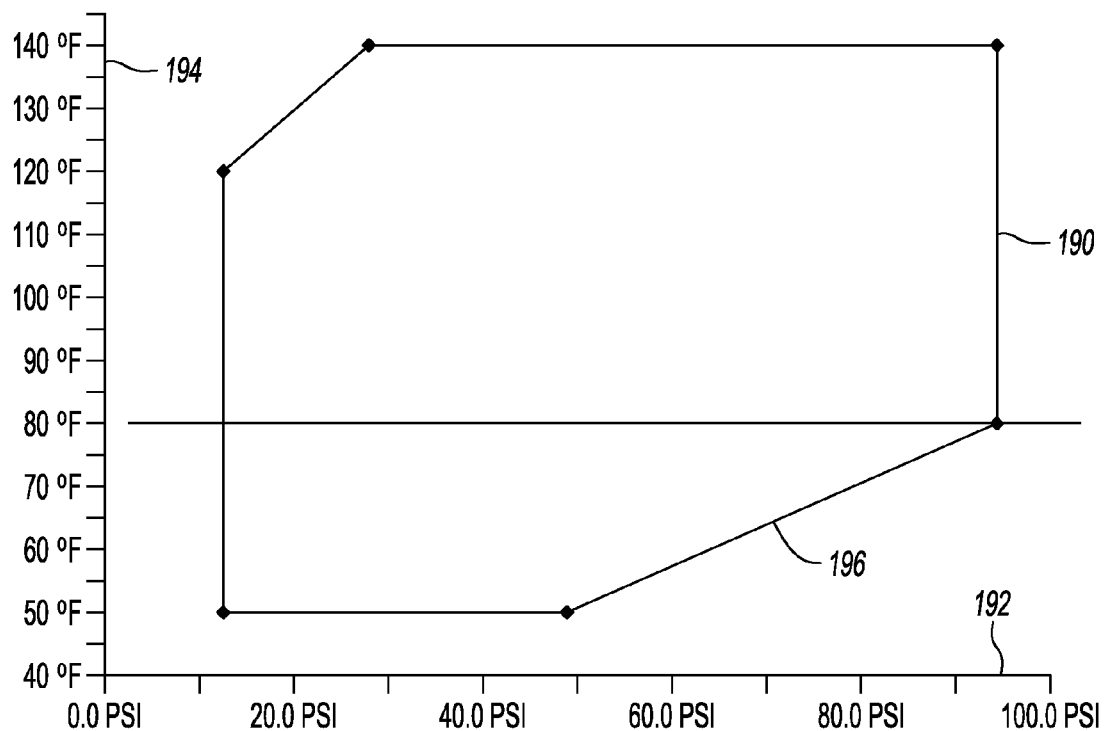
FIG. 3 depicts a graph of an exemplary embodiment of a compressor operating envelope for a specific working fluid.

A head pressure control system may be used to control a high side operating condition of the vapor compression system. Controlling the high side operating condition of the vapor compression system helps to maintain the pressure differential across the expansion valve, which decreases or prevents uncondensed vapor phase working fluid from passing through the expansion valve and decreasing the efficiency of the evaporation process. As shown in FIG. 3, typical head pressure control systems rely on constant set-points for the high side operating condition to decrease the likelihood that the compressor operates outside of an operating envelope of the compressor, which would result in liquid refrigerant entering the inlet to the compressor and drastically reducing the efficiency of the compressor. A constant set-point head pressure control system may decrease the efficiency of a compressor by forcing the compressor to maintain a higher discharge pressure than may be necessary for a particular low side operating condition. A constant set-point head pressure control system may prevent the compressor from operating inside of the operating envelope at condensing pressures below the set-point, thus causing the vapor compression system to operate in a less efficient manner.

The present disclosure is directed to a head pressure control system for controlling the high side operating condition of a vapor compression system. The head pressure control system may be comprised of a vapor compression system having a compressor, condenser, expansion valve, and evaporator. The system may also comprise a high side condition sensor disposed in a high side of the vapor compression system, a low side condition sensor disposed in a low side of the vapor compression system, a controller, and a control device. The low side condition sensor may measure a low side operating condition and communicate the low side operating condition to the controller via a network. The high side condition sensor may measure a high side operating condition and communicate the high side operating condition to the controller via the network. The controller may receive the high and low side operating conditions, determine a theoretical high side operating condition, compare the theoretical high side operating condition to the high side operating condition, and determine a control output. The controller may communicate the control output to a control device via the network, and the control device may influence the high side operating condition based on the control output. The theoretical high side operating condition may be substantially similar to a minimum high side operating condition corresponding to a given low side operating condition.

Aspects of the present disclosure may be embodied in a system, method, or computer program product. Aspects of the disclosed system may take the form of an entirely hardware embodiment, an entirely software embodiment (including firmware, resident software, microcode, etc.), or an embodiment combining software and hardware aspects that may be generally referred to herein as a "circuit," "module," or "system." The present disclosure may take the form of a computer program product embodied in one or more computer-readable medium(s) having computer readable program code or instructions thereon.

Any combination of computer-readable media may be used. Computer-readable media may be or include computer-readable signal media and/or computer-readable storage media. A computer-readable storage medium may include, but may not limited to, an electronic, magnetic, optical, electromagnetic, infrared, or semiconductor system, apparatus, or device, or any combinations thereof. Examples may include, but may not be limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer-readable storage medium may be any tangible medium that can contain, or store a program for use by or in connection with an instruction execution system, apparatus, or device.

A computer-readable signal medium may include a propagated data signal with computer-readable program code embodied therein, such as in baseband or as part of a carrier wave. A propagated signal may take any of a variety of forms, including, but not limited to, electro-magnetic, optical, or any combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including, but not limited to, wireless, wireline, optical fiber cable, radio frequency (RF), any other suitable medium, or any combinations thereof.

Computer program code for carrying out operations for aspects of the present disclosure may be written in any combination of one or more programming languages. Programming languages may include object oriented programming languages, such as Java, Smalltalk, C++, or other similar languages, conventional procedural programming languages, such as the "C" programming language or similar programming languages, rule-based languages, such as any of a number of variants of ladder logic, or parameter based logic systems. The program code may execute entirely on a control processor, partly on the control processor, as a stand-alone software package, partly on the control processor and partly on a remote computer, or entirely on the remote computer or server. In the latter scenario, the remote computer may be connected to the control processor through any type of network, including a local area network (LAN) or a wide area network (WAN), or the connection may be made to an external computer (for example, through the Internet using an Internet Service Provider).

Aspects of the present disclosure are described below with reference to process flow diagrams, mechanical drawings, flowchart illustrations, and/or block diagrams of methods, apparatuses, systems, and computer program products according to embodiments of the disclosure. Each block and/or element of the process flow diagrams, flowchart illustrations, and/or block diagrams, and combinations of blocks and elements in the process flow diagrams, flowchart illustrations, and/or block diagrams may be implemented by computer program instructions. These computer program instructions may be provided to a processor or a general purpose computer, special purpose computer, control processor, programmable controller, or other programmable data processing apparatus to produce a machine, such that the instructions, which execute via the processor of the computer or other programmable data processing apparatus, create a means for implementing the functions/actions specified in the process flow diagram, flowchart illustration, and/or block diagram block(s) or elements(s).

These computer program instructions may be stored in a computer-readable medium that can direct a computer, programmable controller, other programmable data processing apparatus, or other device to function in a particular manner, such that the instructions stored in the computer-readable medium produce an article of manufacture including instructions which implement the functions/actions specified in the process flow diagram, flowchart illustration, and/or block diagram block(s) or elements(s).

The computer program instructions may also be loaded onto a computer, programmable controller, other programmable data processing apparatus, or other devices to cause a series of operational steps to be performed on the computer, programmable controller, other programmable data processing apparatus, or other device to produce a computer-implemented process, such that the instructions which execute on the computer, control processor, other programmable data processing apparatus, or other device provide processes for implementing the functions/actions specified in the process flow diagram, flowchart illustration, and/or block diagram block(s) or elements(s).

Figure 1:
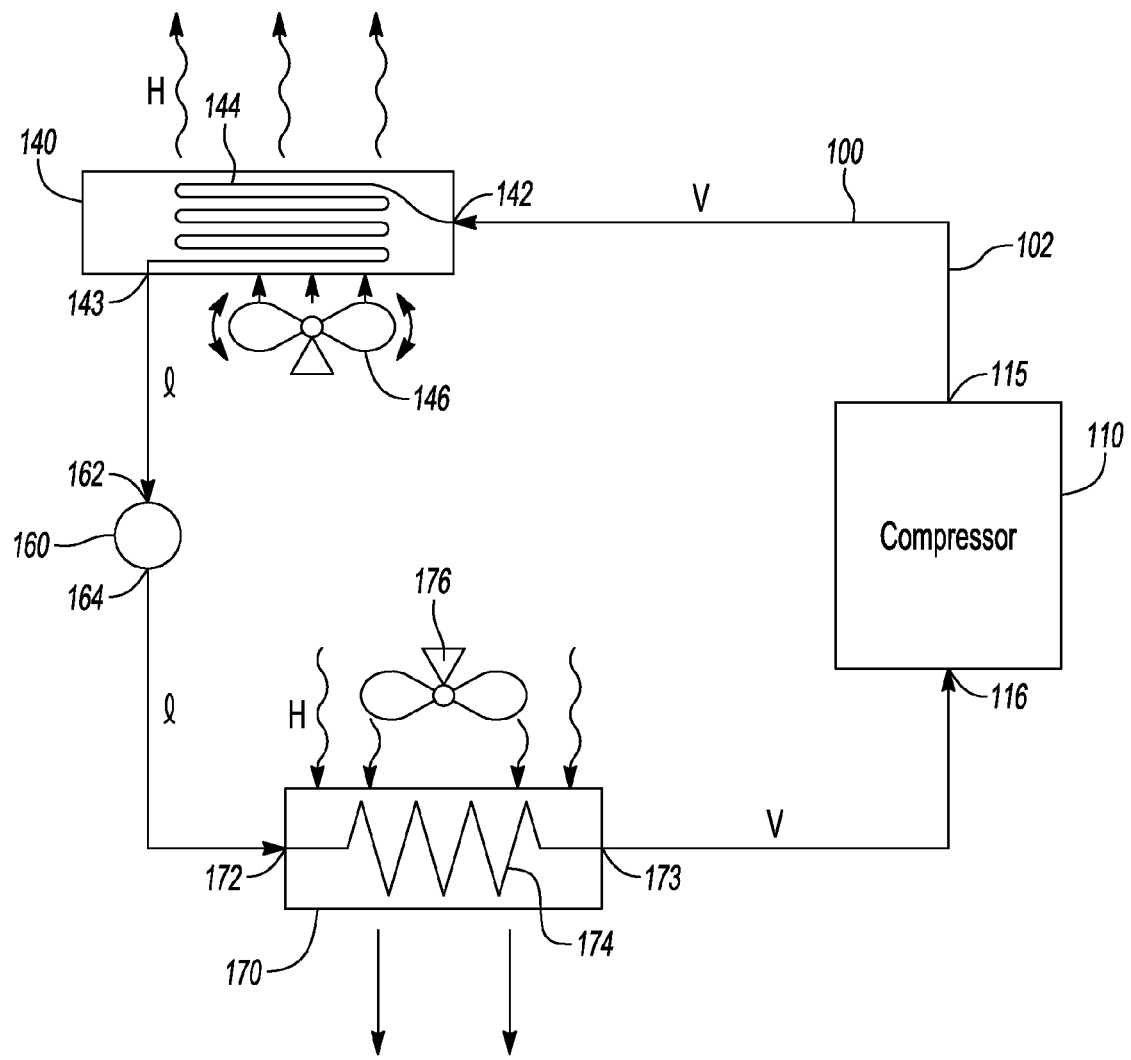
FIG. 1 depicts a process flow diagram for an exemplary embodiment of a vapor compression system.

The present disclosure will now be described in detail with reference to the Figures. FIG. 1 is a process flow diagram depicting an exemplary embodiment of a vapor compression system 100. As shown by the exemplary embodiment in FIG. 1, a vapor compression process 100 may include a compressor 110, a condenser 140, an expansion valve 160, and an evaporator 170 that may be fluidly connected by a fluid flow path 102. As shown by the exemplary embodiment in FIG. 2, the compressor 110 may include a shell assembly 111, a motor assembly 120, and a compression mechanism 130. The compressor 110 may be a scroll compressor, a reciprocating compressor, a rotary compressor, a centrifugal compressor, any other type of compressor, combination of compressors, or device that is able to compress a fluid. In the exemplary embodiment in FIG. 2, the compressor 110 is a scroll compressor. The shell assembly 111 may be comprised of a shell 112, a base 113 disposed on one end of the shell 112, an end cap 114 disposed on another end of the shell 112, a discharge fitting 115 disposed in the end cap 114, and one or more compressor inlets 116 disposed in the shell 112. The shell 112 may be hollow and cylindrical or any other shape.

Figure 2:
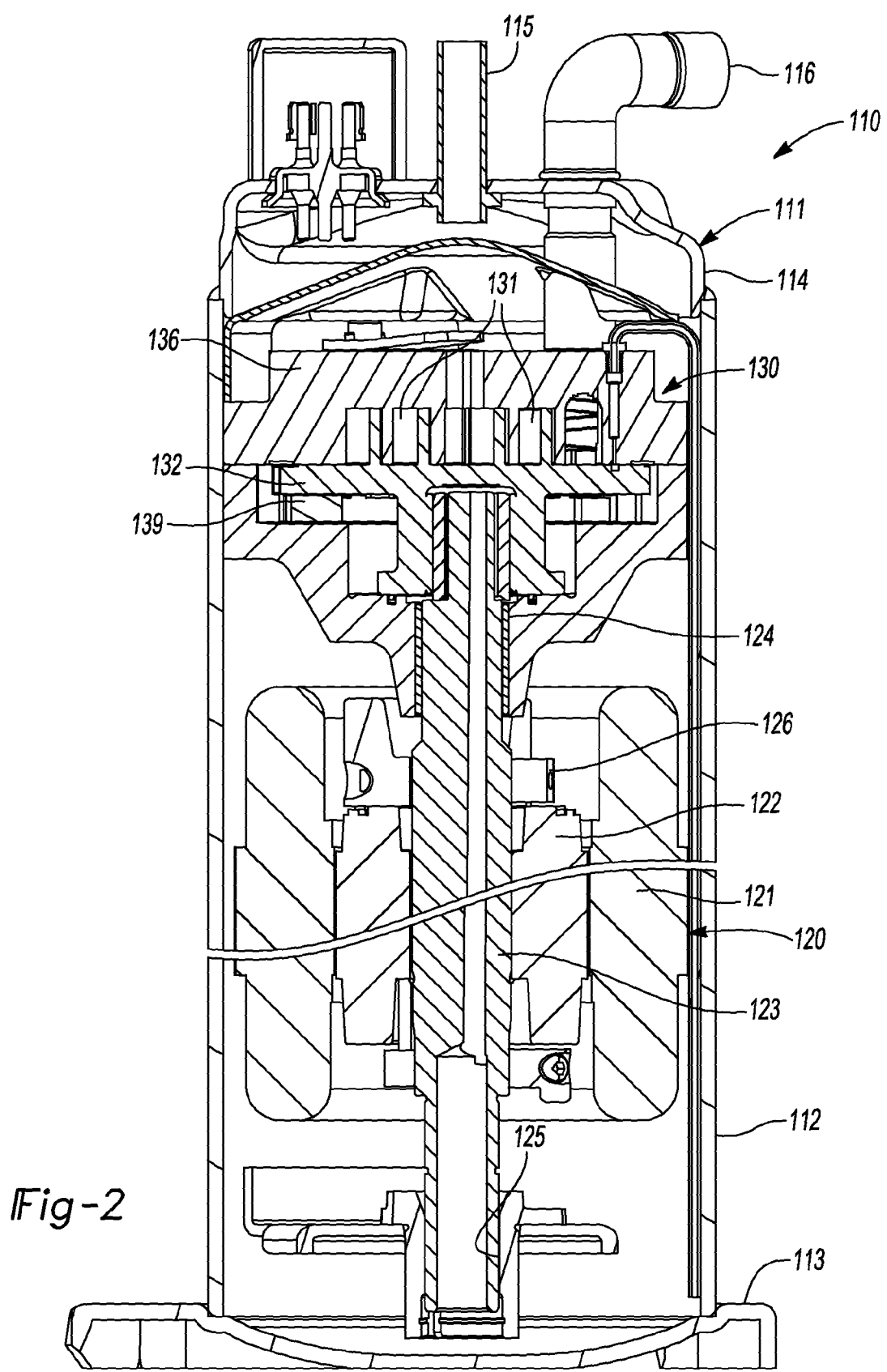
FIG. 2 depicts a sectional view of an exemplary embodiment of a scroll compressor.

As shown in the exemplary embodiment depicted in FIG. 2, the compressor motor assembly 120 may be comprised of a motor stator 121, a motor rotor 122, a drive shaft 123, a main bearing 124, a second bearing 125, and one or more compressor counterweights 126. The motor rotor 122 and compressor counterweights 126 may be coupled with the drive shaft 123. Compressor counterweights 126 may be disposed on either or both sides of the motor rotor 122. The motor stator 121, main bearing 124, and second bearing 125 may be disposed within the shell 112. The drive shaft 123 may be disposed in the second bearing 125 and may extend from the second bearing 125 through the motor stator 121 such that the motor rotor 122 may align with the motor stator 121. The drive shaft 123 may extend through the main bearing 124 and to the compression mechanism 130.

The compression mechanism 130 may be comprised of an orbiting scroll 132, a non-orbiting scroll 136, and an Oldham coupling 139. The orbiting scroll 132 may be disposed on the end of the drive shaft 123. The non-orbiting scroll 136 may be disposed within the shell 112. The Oldham coupling 139 may be coupled to the non-orbiting scroll 136 and may be keyed to the orbiting scroll 132 such that the orbiting scroll 132 may move in an orbital path with respect to the non-orbiting scroll 136 without rotating with respect to the non-orbiting scroll 136. The orbiting scroll 132 and non-orbiting scroll 136 cooperate to define one or more fluid pockets 131 that may decrease in volume as the orbiting scroll 132 completes an orbit with respect to the non-orbiting scroll. Working fluid enters the compressor 110 through the working fluid inlet 116 and enters a fluid pocket 131 at the outer periphery of the compression mechanism 130. As the orbiting scroll 132 cycles through an orbit with respect to the non-orbiting scroll 136, a volume of the fluid pocket 131 may decrease, thereby compressing the working fluid, increasing the temperature and pressure of the working fluid. The compressed working fluid may exit the compression mechanism 130 from a discharge passage disposed in the center of the non-orbiting scroll 136 and may leave the compressor 110 through the discharge fitting 115. In some embodiments, a discharge valve may be disposed at the exit of the discharge passage.

As shown in the exemplary embodiment in FIG. 1, the condenser 140 may be disposed in the fluid flow path 102 downstream of compressor 110. The condenser 140 may include one or more condenser inlets 142, one or more condenser outlets 143, and one or more condenser heat exchangers 144. Working fluid may enter the condenser 140 through the condenser inlet 142, which may be in fluid communication with the discharge fitting 115 of the compressor 110. Working fluid may pass through the condenser heat exchanger 144, wherein heat may be removed from the working fluid as the working fluid condenses from the vapor phase to the liquid phase. The condenser heat exchanger 144 transfers the heat from the working fluid to a heat sink. In some examples, the heat sink may be ambient air, a water bath, or other suitable heat sinks. In the embodiment shown in FIG. 1, the condenser heat exchanger 144 may transfer heat to the ambient air and may have one or more condenser fans 146 to move the ambient air through the condenser heat exchanger 144. The working fluid may exit the condenser 140 through the condenser outlet 143.

The expansion valve 160 may be disposed in the fluid flow path 102 downstream of the condenser 140. The expansion valve 160 may include an expansion valve inlet 162, an expansion valve outlet 164, and a flow restriction. The expansion valve inlet 162 may be in fluid communication with the condenser outlet 143. The expansion valve outlet 164 may be in fluid communication with the evaporator inlet 172. The flow restriction may impede the flow of liquid phase working fluid through the expansion valve 160 causing a drop in the pressure of the working fluid.

An evaporator 170 may be disposed in the fluid flow path 102 downstream of the expansion valve 160. The evaporator 170 may include one or more evaporator inlets 172, one or more evaporator outlets 173, and one or more evaporator heat exchangers 174. Working fluid may enter the evaporator 170 through the evaporator inlet 172, which may be in fluid communication with the expansion valve outlet 164. Working fluid may pass through the evaporator heat exchanger 174, where heat may be removed from air in the space to be cooled (or air to be provided to the space to be cooled) and transferred to the working fluid, which may cause the working fluid to evaporate from the liquid phase to the vapor phase. In some embodiments, the evaporator heat exchanger 174 may have one or more evaporator blowers 176 that may force the air in the space to be cooled (or air to be provided to the space to be cooled) across the evaporator heat exchanger 174. The working fluid may exit the evaporator 170 from the evaporator outlet 173, which may be in fluid communication with the compressor inlet 116.

Generally, a vapor compression system may operate by transferring heat from a space to be cooled to a working fluid. The heat absorbed by the working fluid may be transferred to a heat sink such as an air or water source. As shown in the exemplary embodiment in FIG. 1, working fluid, which may be in a vapor phase, may enter the compressor 110 through the compressor inlets 116. The compressor 110 may compress the working fluid, increasing a pressure of the working fluid to a compressor discharge pressure and increasing a temperature of the working fluid. In some embodiments, the temperature of the working fluid may be increased above a saturation temperature of the working fluid at the compressor discharge pressure. This process may be referred to as superheating the working fluid, which may result in a superheated working fluid. The superheated working fluid may exit the compressor 110 through the discharge fitting 115, which may be in fluid communication with the condenser inlet 142.

Superheated working fluid may enter the condenser 140 through the condenser inlet 142 and flow through the condenser heat exchanger 144. In the condenser heat exchanger 144, heat may be transferred from the superheated working fluid, which may initially cause the temperature of the working fluid to decrease at constant pressure until the working fluid reaches a condenser saturation temperature. The condenser saturation pressure may also be referred to as a head pressure of the vapor compression system 100 or a high side pressure of the vapor compression system 100. The condenser saturation pressure may be slightly less than the compressor discharge pressure due to pressure losses caused by the working fluid flowing through a pipe. In some embodiments, because the working fluid is in the vapor phase, the drag on the walls of the pipes is less than the drag on the walls of the pipes for a liquid phase working fluid. Therefore, the pressure losses may be minimal, such that one may assume that the condenser saturation pressure is substantially similar to the compressor discharge pressure. As shown by the example embodiment in FIG. 3, a saturation pressure of a working fluid may correspond to a saturation temperature of the working fluid such that the condenser saturation pressure may be determined by the condenser saturation temperature.

In some embodiments similar to the embodiment shown in FIG. 1, fans may be used to pass ambient air across the condenser heat exchanger, which may remove heat from the surface of the condenser heat exchanger 144, and working fluid therein, by at least convective heat transfer and may convey the removed heat to the heat sink, which may be the atmosphere. In other embodiments, a water source may be used to remove heat from the condenser heat exchanger 144. Once the working fluid reaches the saturation temperature, at least a portion of the working fluid may condense from a vapor phase to a liquid phase and may eject a latent heat of vaporization, which may be transferred to the heat sink by the condenser heat exchanger 144. In some exemplary embodiments, the condenser heat exchanger 144 may continue to remove heat from the working fluid after the working fluid has been condensed to a liquid, thereby sub-cooling the working fluid to a temperature below the saturation temperature of the working fluid. The pressure of the working fluid may remain substantially constant in the condenser 140. The liquid-phase working fluid may exit the condenser 140 from the condenser outlet 143.

Disposed downstream of the condenser 140 in the exemplary embodiment in FIG. 1, the expansion valve 160 may decrease the pressure of the liquid-phase working fluid. The liquid phase working fluid may enter the expansion valve 160 through the expansion valve inlet 162, which may be in fluid communication with the condenser outlet 143. The expansion valve 160 may restrict the flow of working fluid, causing a pressure drop across the expansion valve 160. The pressure drop may decrease the pressure of the liquid-phase working fluid to a low side pressure. The low side pressure may be substantially similar to a saturation pressure in the evaporator 170. In some embodiments, the decrease in pressure of the working fluid may result in a decrease in the temperature of the working fluid. In other embodiments, the pressure drop may drop the pressure of the liquid-phase working fluid below the saturation pressure, which may result in partial evaporation of the working fluid. The working fluid may exit the expansion valve 160 through the expansion valve outlet 164.

As shown in the exemplary embodiment in FIG. 1, the evaporator 170 may be disposed in the fluid flow path 102 downstream of the expansion valve 160. The working fluid may enter the evaporator 170 through the evaporator inlet 172, which may be in fluid communication with the expansion valve outlet 164. The working fluid may pass through the evaporator heat exchanger 174 at a constant evaporator saturation pressure. The evaporator saturation pressure may be a low side pressure of the vapor compression system. The evaporator saturation pressure may be slightly greater than a suction pressure at the compressor inlet 116 due to a pressure drop caused by fluid flow of the working fluid through a fluid connection from the evaporator to the compressor. In cases of vapor-phase working fluids, the pressure drop may be insubstantial such that the evaporator saturation pressure may be substantially similar to the suction pressure of the compressor 110.

In the evaporator 170, heat may be transferred to the working fluid by passing air from the space to be cooled over the evaporator heat exchanger 174. In some exemplary embodiments, the amount of heat transferred from the air to the working fluid may be directly proportional to the temperature difference between the temperature of the air inside of the space to be cooled and the evaporator saturation temperature. In some embodiments, the working fluid may enter the evaporator heat exchanger 174 at a temperature below the saturation temperature, such that, initially, heat absorbed by the working fluid in the evaporator heat exchanger may raise the temperature of the working fluid to an evaporator saturation temperature corresponding to the low side pressure in the evaporator 170. In other embodiments, conditions (e.g., temperature and pressure) of the working fluid entering the evaporator 170 may be substantially similar to an evaporator saturation temperature and an evaporator saturation pressure, such that the heat loss from the working fluid (i.e., heat absorbed from the air in the space to be cooled) causes the working fluid to evaporate from a liquid phase to a vapor phase. In the evaporator heat exchanger 174, the working fluid may evaporate, changing phases from liquid to gas. In some exemplary embodiments, the heat absorbed by the working fluid from the air inside of the space to be cooled may be substantially equal to the latent heat of vaporization of the working fluid. The heat absorbed from the air inside of the space to be cooled may cause the temperature inside the space to decrease, in effect cooling the space.

The working fluid, which may be substantially in vapor phase, may exit the evaporator 170 through the evaporator outlet 173, which may be in fluid communication with the compressor inlet 116. In some embodiments, the working fluid leaving the evaporator 170 may be at a temperature and pressure substantially equal to the evaporator saturation temperature and evaporator saturation pressure. In other embodiments, the working fluid may leave the evaporator 170 in a superheated state, where the working fluid pressure may be substantially equal to the evaporator saturation pressure and the working fluid temperature may be greater than the evaporator saturation temperature.

For proper operation of the vapor compression system 100, the working fluid may be in the liquid phase entering the expansion valve 160. Incomplete condensation of the working fluid in the condenser 140 may cause working fluid in the vapor phase to enter the expansion valve 160, which may decrease the pressure drop across the expansion valve 160. In this example, the resulting pressure of the working fluid exiting the expansion valve 160 may be higher. Since the evaporator 170 may operate at a substantially constant pressure, the higher working fluid pressure exiting the expansion valve 160 may lead to a higher evaporator saturation pressure and a higher evaporator saturation temperature. This higher evaporator saturation temperature may decrease the temperature difference between the air in the space and the working fluid, which may decrease the heat transferred to the working fluid. A reduction in heat transfer may reduce the efficiency of the vapor compression system 100. Therefore, passage of vapor phase working fluid through the expansion valve 160 may reduce the cooling efficiency of the vapor compression system 100.

The presence of vapor-phase working fluid at the expansion valve inlet 162 may be attributed to incomplete condensation of the working fluid in the condenser 140. Incomplete condensation in the condenser 140 may be caused by a condenser saturation pressure that may be too low. In the condenser 140, the latent heat of vaporization of the working fluid may be removed by transferring heat from the working fluid to a heat sink, such as the atmosphere or a water jacket. Like the evaporator 170, in exemplary embodiments, heat transfer in the condenser 140 is directly proportional to the temperature difference between the working fluid condenser saturation temperature and the temperature of the heat sink. To transfer heat to the heat sink, the condenser saturation temperature may be higher than the temperature of the heat sink such that the heat energy may flow to an area of lower entropy (lower temperature). A lower condenser saturation pressure may correspond to a lower condenser saturation temperature, which may reduce the condenser temperature difference and reduce the heat transfer in the condenser 140. The result may be incomplete condensation of the working fluid in the condenser 140 and vapor-phase working fluid entering the expansion valve.

Proper evaporator saturation pressure and condenser saturation pressure may also be important for proper compressor 110 operation. An evaporator saturation pressure that may be too high may result in incomplete evaporation of the working fluid in the evaporator 170, which may allow liquid-phase working fluid to enter the compressor 110 through the compressor inlet 116. Introduction of liquid-phase working fluid to the compressor 110 may decrease the efficiency of the compressor 110, which may expend energy to finish the phase change of the working fluid. Because the compressor 110 may expend energy to complete the phase change, less energy may be imparted to the working fluid to increase the pressure. This may result in a lower head pressure exiting the compressor, which may correspond to a lower condenser saturation pressure, lower condenser saturation temperature, and eventual incomplete condensation of the working fluid in the condenser 140. This may result in vapor-phase working fluid passing through the expansion valve 160, which may cause the evaporator inefficiencies previously discussed.

To operate properly, the vapor compression system 100 may maintain a pressure difference between the condenser saturation pressure and the evaporator saturation pressure that may be greater than a minimum pressure difference.

FIG. 3 depicts a graph of an exemplary embodiment of a compressor operating envelope for a specific working fluid. As shown by the example embodiment in FIG. 3, acceptable operating conditions may be expressed as an operating envelope 190 for a specific vapor compression system 100 using a specific working fluid. In exemplary embodiments, the working fluid may be a refrigerant and may be selected for specific thermodynamic properties. FIG. 3 shows an example embodiment of an operating envelope 190 for a specific working fluid in a specific vapor compression system. The operating envelope 190 may be shown on a graph of condenser saturation pressure 194 versus evaporator saturation pressure 192, wherein the condenser saturation pressure 194 may be representative of saturation conditions in the condenser and the evaporator saturation pressure 192 may be representative of saturation condition in the evaporator. The saturation condition in the condenser may be a high side condition, and the saturation condition in the evaporator may be a low side condition. Conditions substantially within the operating envelope 190 may result in proper operation of the vapor compression system, and conditions substantially outside of the operating envelope 190 may result in an inoperable (or poorly functioning) vapor compression system.

A bottom profile 196 may represent the most efficient portion of the operating envelope 190. The bottom profile 196 may define the lowest condenser saturation pressures 194 of the operating envelope 190. Along the bottom profile 196 of the operating envelope 190, the compressor motor may require fewer revolutions to reach the lower condenser saturation pressure 194, which may lead to a reduction in energy usage and gains in energy efficiency. The bottom profile 196 may be expressed in a look-up table, by an equation, or in graphical form as shown in FIG. 3. The bottom profile 196 may also be expressed in terms of the high side condition versus the low side condition.

Figure 4:
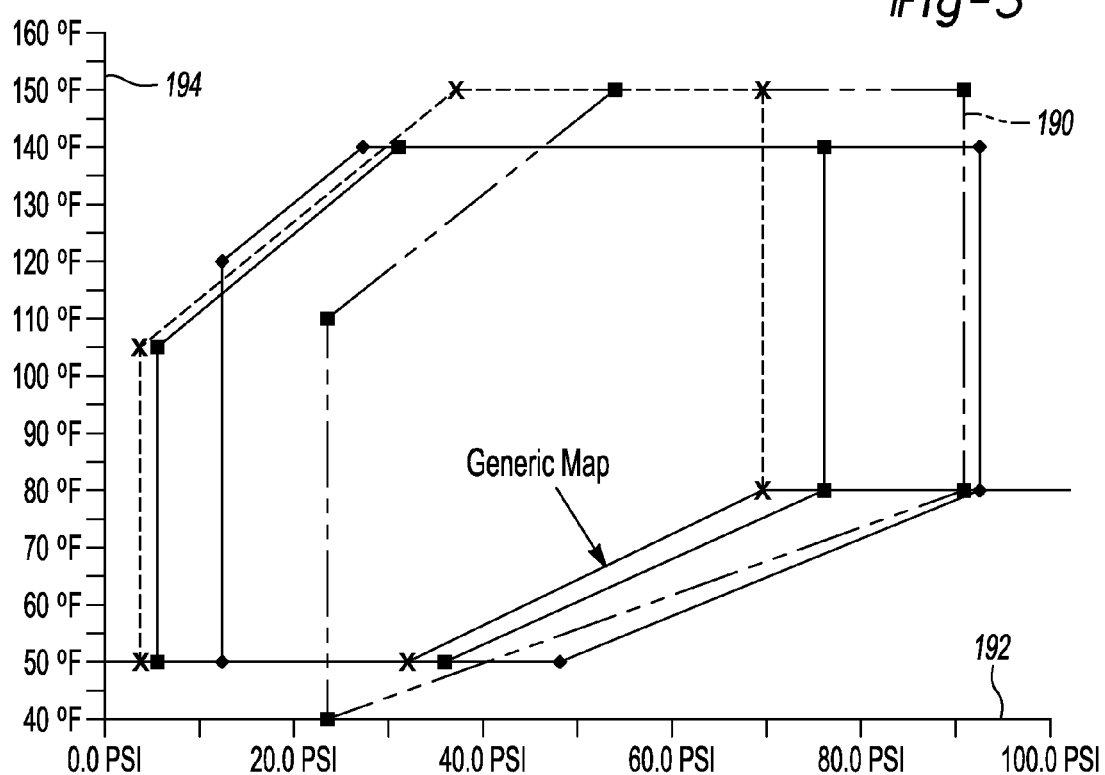
FIG. 4 depicts a graph of multiple exemplary embodiments of a compressor operating envelope.

The operating envelope 190 may be influenced by the choice of working fluid and by the characteristics of the evaporator 170, condenser 140, and expansion valve 150. As shown by the exemplary operating envelopes in FIG. 4, changing the working fluid may change the operating envelopes 190 of the vapor compression system 100. The examples of the operating envelopes 190 may be shown on a graph of condenser saturation pressure 194 versus evaporator saturation pressure 192, wherein the condenser saturation pressure 194 may be representative of saturation conditions in the condenser 140 and the evaporator saturation pressure 192 may be representative of saturation condition in the evaporator 170. This may result from differences in the thermodynamic properties of different working fluids. The operating envelope 190 may also be influenced by the characteristics of the evaporator 170 and condenser 140. In both the condenser 140 and evaporator 170, in some exemplary embodiments, the heat transfer rate may be directly proportional to the surface area of the heat exchangers 144, 174.

In exemplary embodiments, the high side condition of the vapor compression system 100 may be controlled such that the vapor compression system 100 may operate near the bottom profile 196 of the operating envelope 190, which may maximize the energy efficiency of the compressor 110. As shown by the exemplary embodiment in FIG. 5, the high side condition of a vapor compression system 202 may be controlled by using a head pressure control system 200. As described previously, the vapor compression system 202 may be comprised of a compressor 210, a condenser 220, an expansion valve 206, and an evaporator 250 all fluidly connected by a fluid flow path 203. In an exemplary embodiment, the head pressure control system 200 may be comprised of a high side condition sensor 230 associated with a high side 204 of the vapor compression system 200, a low side condition sensor 232 associated with a low side 205 of the vapor compression system 200, an information storage device 244, a control device 248, a programmable controller 240 capable of operating the instruction of a program 300, all connected through a network 242.

Figure 5:
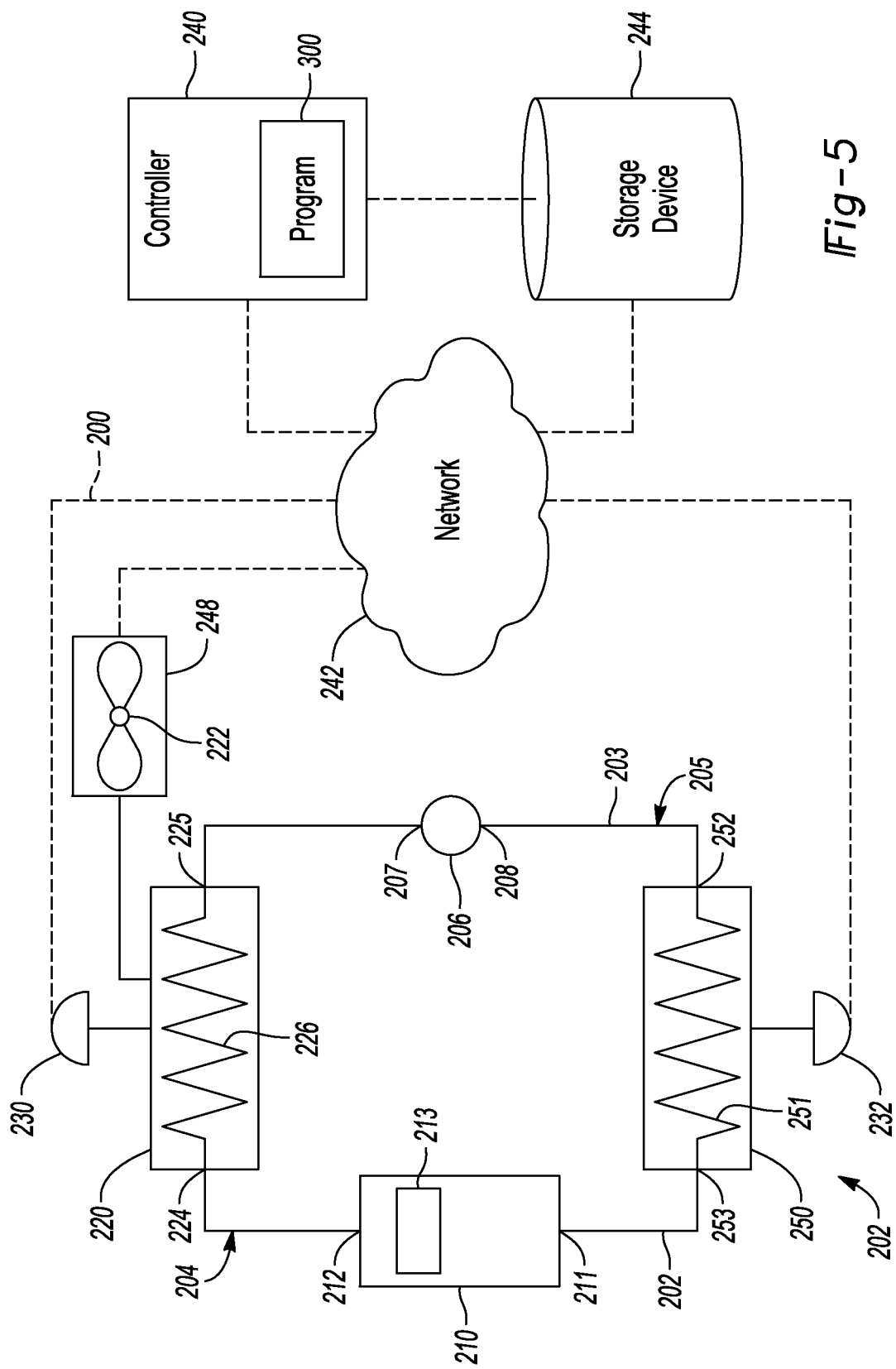
FIG. 5 depicts a process flow diagram of an exemplary embodiment of a head pressure control system.
Figure 6:
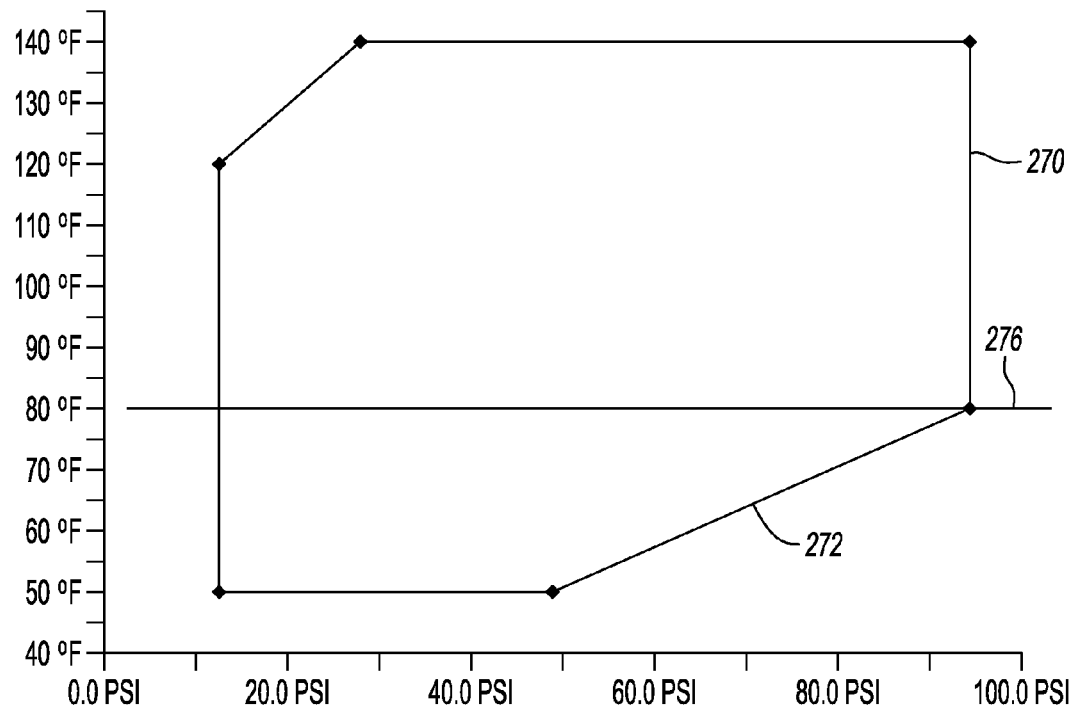
FIG. 6 depicts a graph of an exemplary embodiment of a compressor operating envelope that includes a bottom profile of the compressor operating envelope for a specific working fluid.
Figure 7:
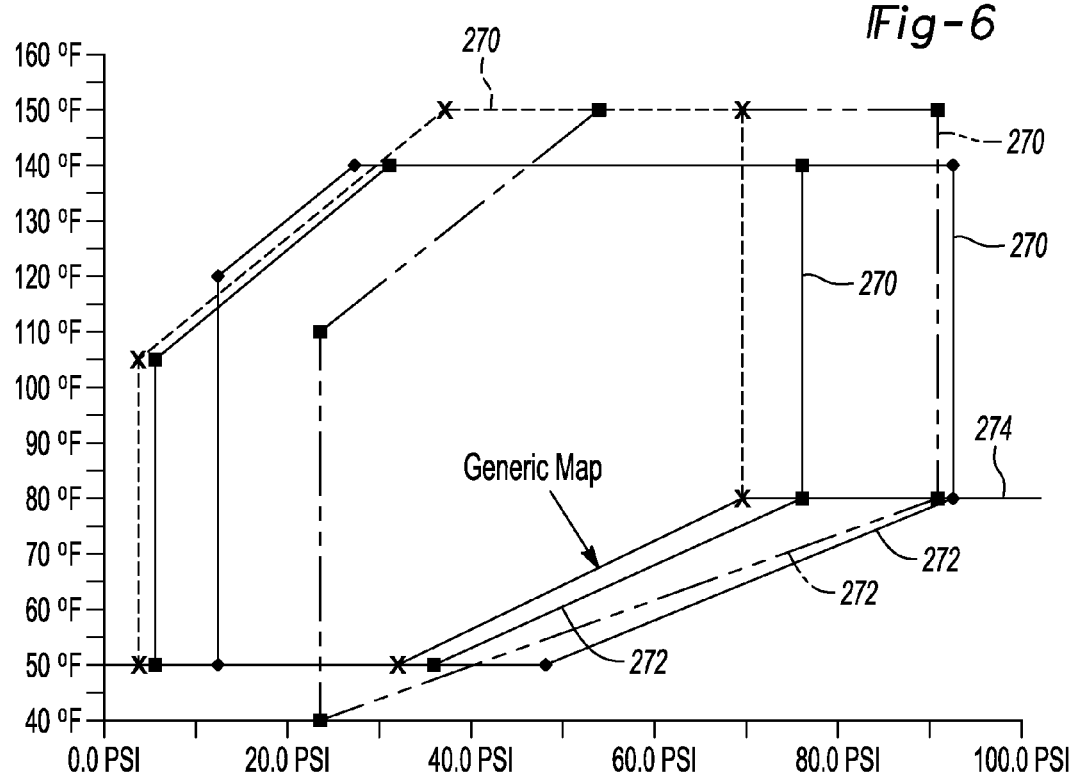
FIG. 7 depicts a graph of an exemplary embodiment of a generic bottom profile that may accommodate compressor operating envelopes of a plurality of specific working fluids.
Figure 8:
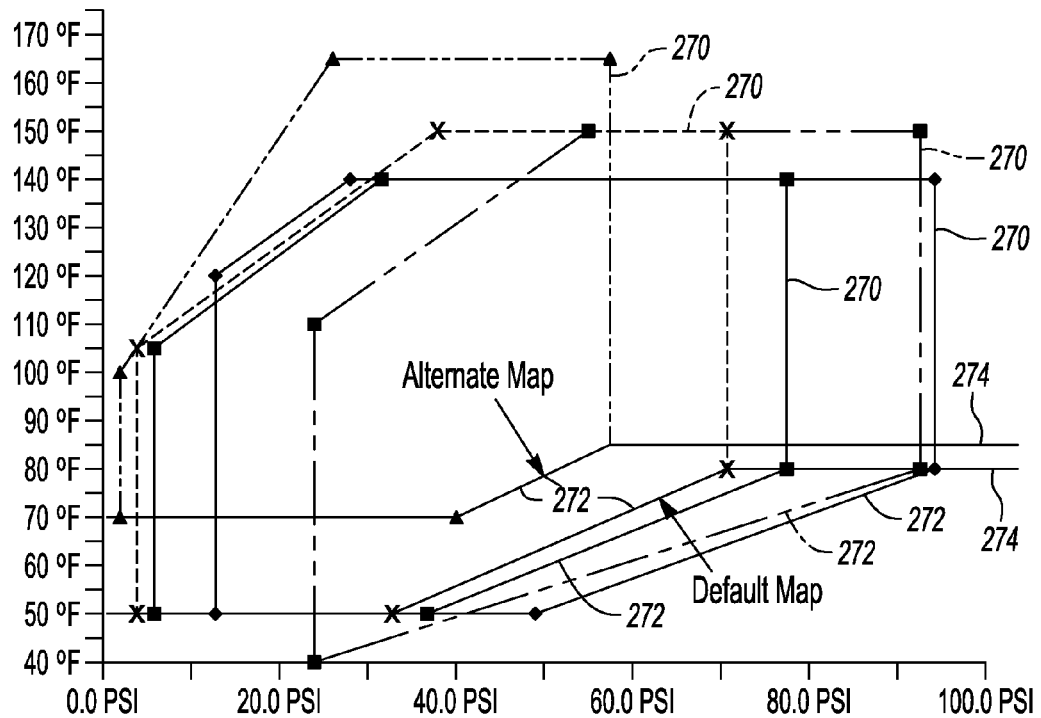
FIG. 8 depicts a graph of an exemplary embodiment of one or more generic bottom profiles, where each of the generic bottom profiles accommodates one or more specific working fluids.
Figure 9:
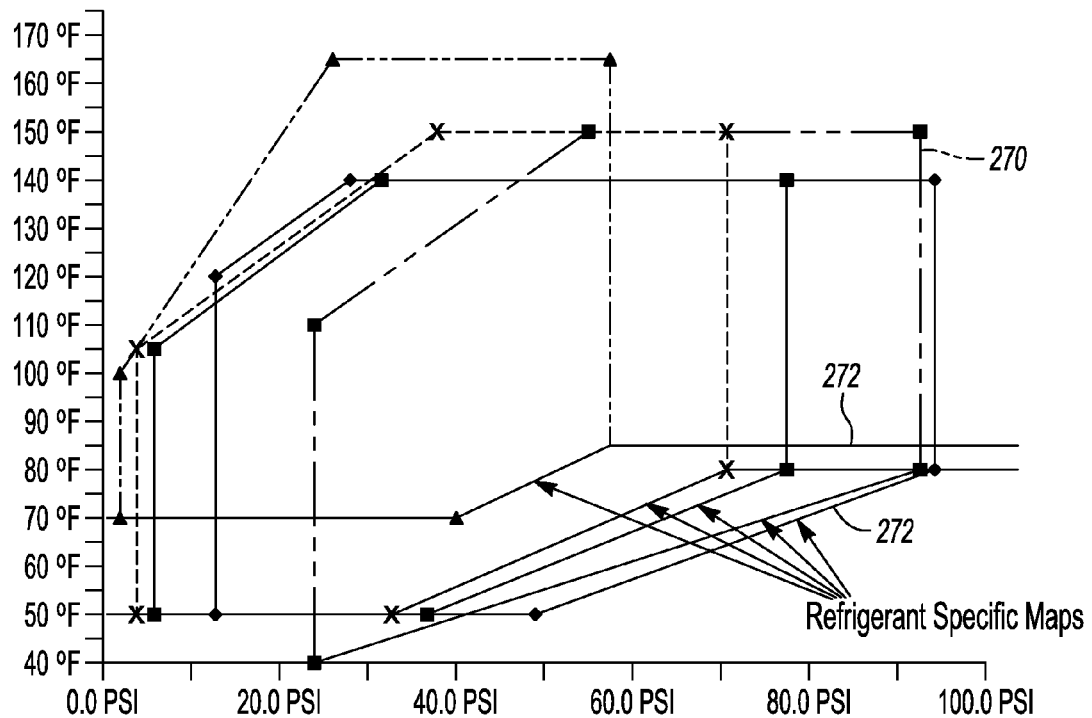
FIG. 9 depicts a graph of an exemplary embodiment having the bottom profile of the compressor operating envelope for each of a plurality of working fluids.
Figure 10:
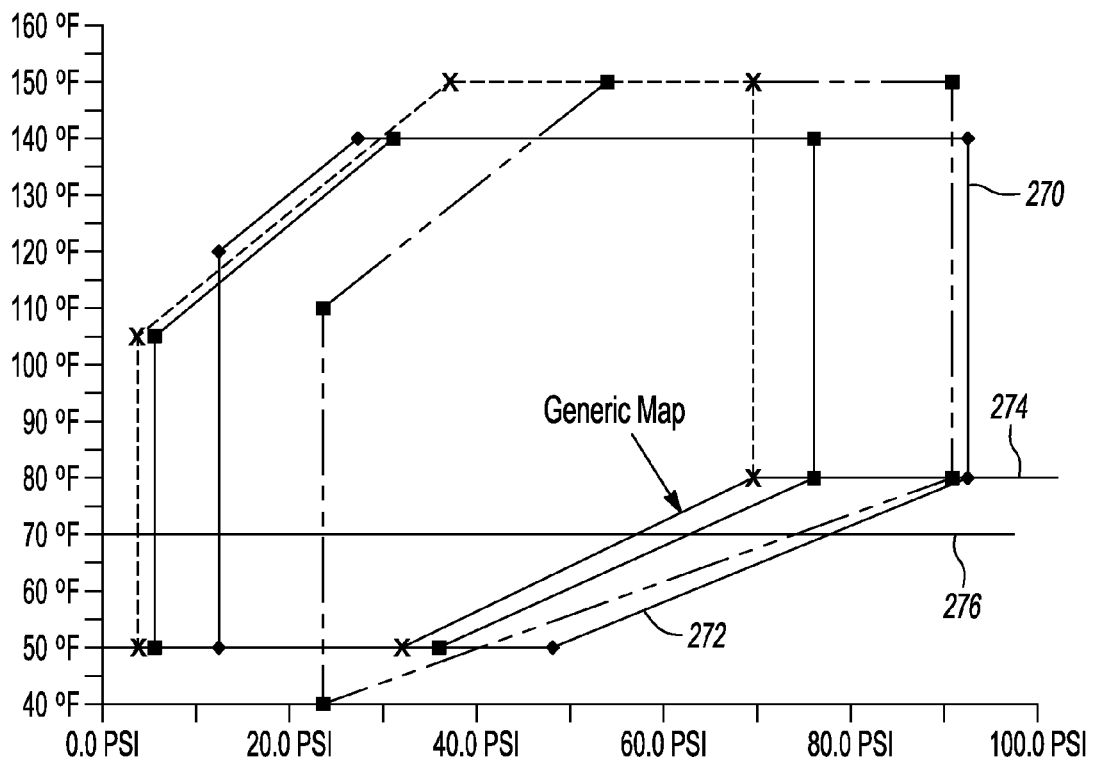
FIG. 10 depicts a graph of an exemplary embodiment having a generic bottom profile and a minimum condensing condition.
Figure 11:
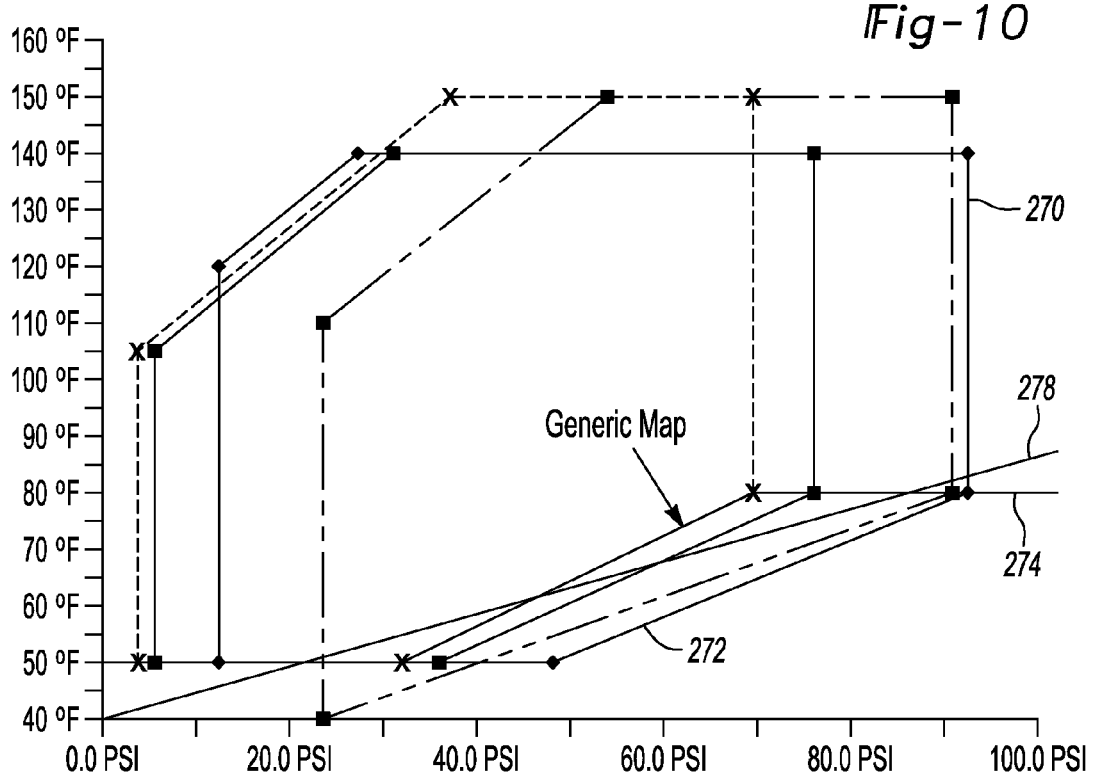
FIG. 11 depicts a graph of an exemplary embodiment having a generic bottom profile and a minimum differential.

As shown by the exemplary embodiment in FIG. 5, the high side condition sensor 230 may be associated with the high side 204 of the vapor compression system 202. The high side 204 of the vapor compression system 202 may extend from an outlet of a compression mechanism 213 of the compressor 210 to an expansion valve inlet 207 and may include the condenser 220 and compressor discharge fitting 212. The high side condition sensor 230 may measure the high side condition in the condenser 220, in the condenser heat exchanger 226, between the compression mechanism 213 and the compressor discharge fitting 212, between the compressor discharge fitting 212 and the condenser inlet 224, and/or between the condenser outlet 225 and the expansion valve inlet 207. In some embodiments similar to the exemplary embodiment in FIG. 5, the high side condition sensor 230 may be located substantially partway through the condenser heat exchanger 226. In other embodiments, the high side condition sensor 230 may be associated substantially near the compressor discharge fitting 212. In other embodiments, the high side condition sensor 230 may be associated substantially near the expansion valve inlet 207. In exemplary embodiments, the high side condition sensor 230 may connect through the network 242 to the controller 240. Exemplary embodiments of the high side condition sensor 230 may produce an electronic signal corresponding to a high side operating condition and may communicate the electronic signal to the controller 240 via the network 242. Although FIG. 5 depicts a single high side condition sensor 230, other exemplary embodiments may include two or more sensors.

Exemplary embodiments of the high side condition sensor 230 may be a pressure sensor or a temperature sensor, although other types of sensors may be used. A high side condition sensor 230 that is a temperature sensor may generate an electric signal corresponding to a temperature of the working fluid at the sensing location and may be a thermistor, thermocouple, resistance thermometer (RTD), or other temperature sensor or transducer. In an example, the high side condition sensor 230 may be a thermistor that is located approximately two-thirds of the way along the length of the condenser heat exchanger 226 to measure the condenser saturation temperature. In another example, the high side condition sensor 230 may be a thermocouple located approximately halfway along the length of the condenser heat exchanger 226. Examples of the high side condition sensor 230 that is a pressure sensor/transducer may generate an electrical signal corresponding to a pressure of the working fluid at the sensor location and may be a piezoresistive, capacitive, ceramic capacitive, thick film strain gage, thin film strain gage, electromagnetic, piezoelectric, optical, potentiometric, MEMs (microelectromechanical) using oil as an intermediate cavity, or other type of pressure sensor/transducer. In an example, the high side condition sensor 230 may be a ceramic capacitive pressure transducer that is located at a position that is approximately two-thirds of the distance between the condenser inlet 224 and the condenser outlet 225, and measures the condenser saturation pressure. In another example, the high side condition sensor 230 may be a pressure transducer that is a thick film strain gage bonded to a ceramic diaphragm and is located near the compressor discharge fitting 212.

As shown by the exemplary embodiment in FIG. 5, the low side condition sensor 232 may be associated with the low side 205 of the vapor compression system 202. Exemplary embodiments of the low side 205 of the vapor compression system 202 may extend from the expansion valve outlet 208 to the compressor inlet 211 and may include the evaporator 250. The low side 205 may also extend from the compressor inlet 212 to an inlet to the compression mechanism 213. The low side condition sensor 232 may measure the low side condition in the evaporator 250, in the evaporator heat exchanger 251, between the expansion valve outlet 208 and the evaporator inlet 252, between the evaporator outlet 253 and the compressor inlet 211, and/or between the compressor inlet 211 and the compression mechanism 213. In some embodiments similar to the exemplary embodiment in FIG. 5, the low side condition sensor 232 may be located partway through the evaporator heat exchanger 251. In other embodiments, the low side condition sensor 232 may be located near the compressor inlet fitting 211. In other embodiments, the low side condition sensor 232 may be located near the expansion valve outlet 208. The low side condition sensor 232 may be in communication with the controller 240 through the network 242. In exemplary embodiments, the low side condition sensor 232 may produce an electronic signal corresponding to a low side operating condition and may communicate the electronic signal to the controller 240 via the network 242.

Exemplary embodiments of the low side condition sensor 232 may be a pressure sensor or a temperature sensor, although other types of sensors may be used. A low side condition sensor 232 that is a temperature sensor may generate an electric signal corresponding to a temperature of the working fluid at the sensing location and may be a thermistor, thermocouple, resistance thermometer (RTD), or other temperature sensor or transducer. In an example, the low side condition sensor 232 may be a thermistor that is located at a position that is approximately two-thirds of the distance between the evaporator inlet 253 and the evaporator outlet 252, and may measure the evaporator saturation temperature. In another example, the low side condition sensor 232 may be a thermocouple that is located approximately halfway along the length of the evaporator heat exchanger 251. In exemplary embodiments where the low side condition sensor 232 is a pressure sensor, the low side condition sensor 232 may generate an electrical signal corresponding to a pressure of the working fluid at the sensor location and may be a piezoresistive, capacitive, ceramic capacitive, thick film strain gage, thin film strain gage, electromagnetic, piezoelectric, optical, potentiometric, MEMs (microelectromechanical) using oil as an intermediate cavity, or another type of pressure sensing device. In an example, the low side condition sensor 232 may be a ceramic capacitive pressure transducer that is located substantially two-thirds along the length of the evaporator heat exchanger 251, and may sense the evaporator saturation pressure. In another example, the low side condition sensor 232 may be a pressure transducer that is a thin film strain gage bonded to a ceramic diaphragm, which is located near the compressor inlet 211, and may measure a suction pressure of the compressor 210.

As shown by the exemplary embodiment in FIG. 5, a controller 240 may be in communication with the network 242. The controller 240 may be capable of executing a head pressure control program 300 (FIG. 13) and may be a programmable electronic controller, personal computer, laptop computer, desktop computer, netbook computer, smart phone, or any programmable electronic device capable of executing the head pressure control program 300 and communicating with other system components via the network 242. The controller 240 may include the head pressure control program 300, which may execute locally and may have the ability to the receive the high side operating condition and low side operating condition from the network 242, compare the operating condition data to optimal operating conditions, determine a control output signal, and communicate the control output signal to the control device 248 via the network 242. The head pressure control program 300 will be described in further detail below. In some embodiments similar to the exemplary embodiment in FIG. 5, the controller 240 may be a programmable electronic controller and may include the head pressure control program 300.

As shown in FIG. 5, the head pressure control system 200 may include a storage device 244. In some embodiments similar to the exemplary embodiment in FIG. 5, the storage device 244 may be in communication with the network 242. In other embodiments similar to the exemplary embodiment in FIG. 12, the storage device 244 may be integrated with the controller 240. The storage device 244 may be persistent storage and may be a computer-readable storage medium. The storage device 244 may also include a magnetic hard disk drive, solid state hard drive, a semiconductor storage device, read-only memory (ROM), erasable programmable read-only memory (EPROM), flash memory, or any other computer-readable storage media that is capable of storing program instructions or digital information. The media used by the storage device 244 may also be removable. Examples include but are not limited to a removable hard drive, optical and magnetic disks, thumb drives, and smart cards that may be inserted into a drive for transfer onto another computer-readable storage medium that may also be part of the storage device.

The storage device 244 may store digital information pertaining to the operating envelope of the vapor compression system 200 and/or the head pressure control program or any program instructions related thereto. The digital information may comprise one or more look-up tables correlating low side operating condition to a theoretical high side operating condition or may comprise one or more formulas or algorithms for calculating the theoretical high side operating condition from the low side operating condition. The digital information in the look-up tables may be substantially similar to the bottom profile of the operating envelope of the compressor.

As depicted by the exemplary embodiments in FIG. 5, the high side condition sensor 230, low side condition sensor 232, controller 240, storage device 244, and control device 248 may be connected to a network 242. The network 242 may be a local area network (LAN), a wide area network (WAN) such as the Internet, or a combination thereof, and can include wired, wireless, or fiber optic connections. In general, network 242 may be any combination of connections and protocols that will support communications between the components of the head pressure control system 200.

FIGS. 6 through 11 show operating envelopes 270 and bottom profiles 272 representing several embodiments of the digital information in the lookup tables stored in the storage device. In some embodiments similar to the exemplary embodiment in FIG. 6, the storage device may include a single lookup table that may contain digital information on the bottom profile 272 of the operating envelope 270 for a specific working fluid. In other embodiments similar to the exemplary embodiment in FIG. 7, the storage device may include a single lookup table that may contain digital information on a generic bottom profile 274 that may be suitable for a range of working fluids. In other embodiments similar to the exemplary embodiment in FIG. 8, the storage device may include one or more lookup tables that may contain digital information on one or more generic bottom profiles 274, such that each generic bottom profile 274 may be suitable for one or more specific working fluids. In other embodiments similar to the exemplary embodiment in FIG. 9, the storage device may include a plurality of lookup tables, wherein each lookup table includes digital information on the bottom profile 272 of the operating envelope 270 for a specific working fluid. In these embodiments, the bottom profile 272 for a specific working fluid may be selected at installation, and may be changed in the event of a change in type of working fluid. In other embodiments similar to the exemplary embodiment in FIG. 10, the storage device may include one or more lookup tables and one or more minimum condensing conditions 276, wherein the one or more lookup tables may contain digital information for the bottom profiles 272 of specific working fluids and the minimum condensing condition 276 may be a constant value. In other embodiments similar to the exemplary embodiment in FIG. 11, the storage device may include one or more lookup tables, wherein some of the one or more lookup tables contain digital information on the bottom profiles 272 of specific working fluids and other lookup tables contain digital information representing a minimum differential function 278, which may model the bottom profiles 272 of one or more working fluids as a single function. In some embodiments, the minimum differential function 278 may be substantially similar to a linear function of high side operating condition versus low side operating condition. Any of the above mentioned lookup tables may be stored in the storage device as one or more formulas, functions, algorithm, and/or any other form of electronic information that is able to be used by the head pressure control program 300 and/or head pressure control program 400.

As shown in FIG. 5, the head pressure control system 200 may include one or more control devices 248 that may be used to influence the high side operating condition. The control device 248 may be connected to the network 242 and may be configured to receive a control output from the controller 240 via the network 242 and adjust a control device operating condition based on the control output. In some embodiments, the control device 248 may communicate a control device operating condition back to the controller 240 via the network 242. The control device 248 may be a condenser fan, electronic or mechanical valve disposed in the high side, compressor control electronics, condenser bypass system, other control device, and/or any combinations of the aforementioned devices. In some embodiments similar to the exemplary embodiment in FIG. 5, the control device 248 may be one or more condenser fans 222 configured to receive the control output from the controller 240 via the network 242 and adjust the control device operating condition, which is a fan speed, based on the control output. In these embodiments, a high side operating condition that is too low may cause the condenser fans 222 to decrease in speed to reduce the heat transfer of the condenser 220.

Likewise, for a high side operating condition that is too high, the condenser fans 222 may increase to increase the heat transferred out of the working fluid.

Figure 12:
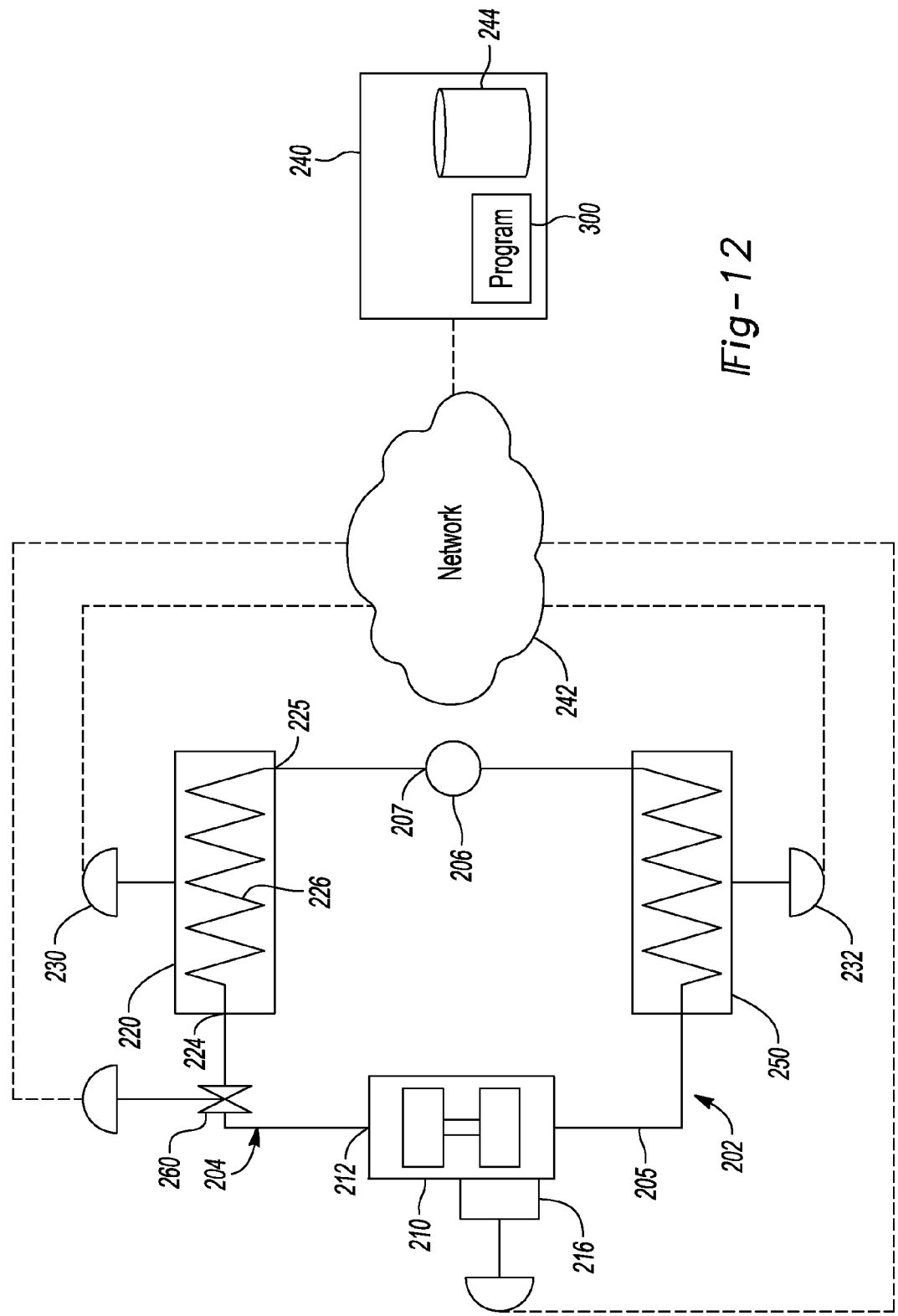
FIG. 12 depicts a process flow diagram of an exemplary embodiment having a storage device integrated with the controller.

In other embodiments similar to the exemplary embodiment in FIG. 12, the control device 248 may be a control valve 260 disposed in the high side 204 of the vapor compression system 202. The control valve 260 may be connected to the network 242 and may receive the control output from the controller 240 via the network 242. The control valve 260 may be capable of variable positioning along a continuum of positions between a minimum open position and a maximum open position. The control device operating condition may be a valve position. In some of these embodiments, the control valve 260 be disposed between the compressor discharge fitting 212 and the condenser inlet 224 and may restrict the flow of vapor-phase working fluid into the condenser 220, thereby creating a pressure drop across the valve that reduces the head pressure and the corresponding high side operating condition. In some of these embodiments, the control valve 260 may be located between the condenser outlet 225 and the expansion valve inlet 207 and may restrict the flow of liquid-phase working fluid exiting the condenser 220. The restriction may cause liquid-phase working fluid to back up into the condenser heat exchanger 226, which may work to increase the pressure in the condenser 220. In other embodiments, the control valve 260 may be associated with a feedback loop that removes liquid-phase working fluid from the flow path between the condenser outlet 225 and expansion valve inlet 207 and delivers the liquid-phase working fluid to the condenser inlet 224. These embodiments may also cause liquid-phase working fluid to back up in the condenser 220 and increase the pressure in the condenser 220.

In other embodiments similar to a second exemplary embodiment depicted in FIG. 12, the control device 248 may be a compressor control electronics 216, which may control the operation of the compressor 210. The compressor control electronics 216 may be connected to the network 242 and may receive the control output from the controller 240 via the network 242. In some embodiments, the compressor control electronics 216 may be configured to start the compressor 210 at a high set point and stop the compressor 210 at a low set point, such that the compressor 210 cycles on and off in response to demand. The control output received through the network 242 may change the high set point, resulting in a change in the high side operating condition of the vapor compression system 202. The compressor electronics 216 may also be configured to a timed operation, wherein the compressor 210 runs for a specified run time and then turns off for a specified off time. The control output received through the network 242 may change the compressor 210 run time and off time, thereby creating a corresponding change in the high side operating condition. In other embodiments, the compressor 210 may be a variable speed compressor and may have compressor control electronics 216 capable of varying the speed of the compressor 210 along a continuum from a minimum speed to a maximum speed. In these embodiments, the control output received through the network may change the speed of the compressor 210, thereby changing the high side operating condition of the vapor compression system 202. In other exemplary embodiments, other devices and schemes may be used to influence the high side operating condition of the vapor compression system 202. The aforementioned embodiments of control devices provide only illustrative embodiments of the present disclosure and are not meant to imply any limitation on the type or nature of control device 248 that may be used to influence the high side operating condition of the vapor compression system 202.

As depicted by the exemplary embodiments in FIG. 12, the high side condition sensor 230, low side condition sensor 232, controller 240, storage device 244, and control device may be connected to a network 242. The network 242 may be a local area network (LAN), a wide area network (WAN) such as the Internet, or a combination thereof, and can include wired, wireless, or fiber optic connections. In general, network 242 may be any combination of connections and protocols that will support communications between the components of the head pressure control system 200.

Figure 13:
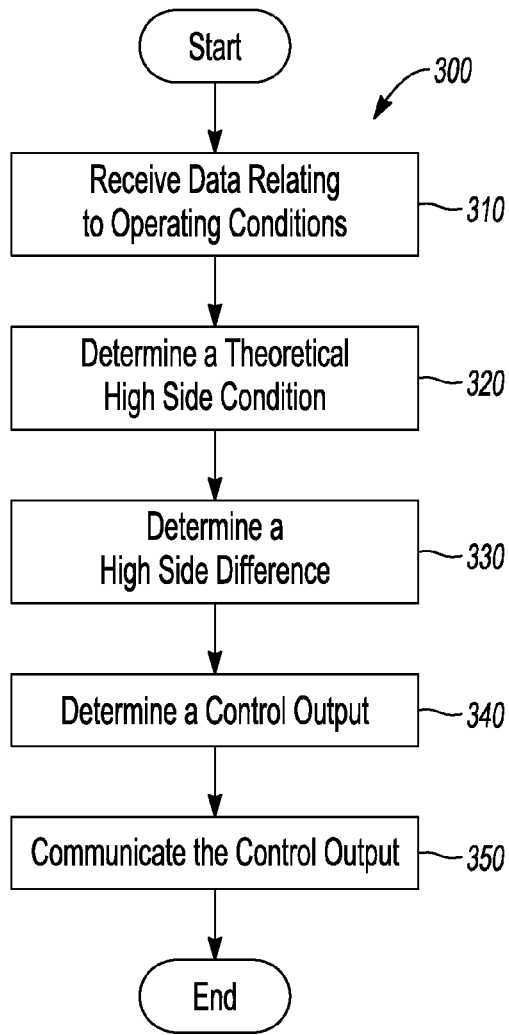
FIG. 13 depicts a flowchart for an exemplary embodiment of a head pressure control program.

FIG. 13 is a flowchart depicting the operational steps of the head pressure control program 300 for controlling the high side operating condition of a vapor compression system in accordance with an embodiment of the present disclosure. In step 310, the head pressure control program 300 receives data relating to operating conditions of the vapor compression system 200. In some exemplary embodiments, the head pressure control program receives a low side operating condition from the low side condition sensor and receives a high side operating condition from the high side condition sensor. In some embodiments, the head pressure control program 300 may also receive a control device operating condition from the control device via the network. In step 320, the head pressure control program 300 determines a theoretical high side operating condition corresponding to the low side operating condition. In some embodiments, the head pressure control program 300 may determine the theoretical high side operating condition by accessing and utilizing the look-up table stored in the storage device 244 that correlates the theoretical high side operating condition corresponding to the low side operating condition. In other embodiments, the head pressure control program 300 determines the theoretical high side operating condition by calculating the theoretical high side operating condition from the low side operating condition using the correlation formula. In some embodiments, the head pressure control program 300 may determine that the calculated theoretical high side operating condition is below a threshold value. Therefore, the head pressure operating control program 300 may determine that theoretical high side operating condition may not go below this predetermined threshold value.

In step 330, the head pressure control program 300 determines a high side difference by comparing the theoretical high side operating condition to the high side operating condition. Some examples of operating conditions that may be compared by the head pressure control program 300 include, but are not limited to: fan speed, whether a fan is operating, valve setting adjustments, etc. In some embodiments, the head pressure control program 300 may perform operations to try and cause the high side operating condition to move closer to the theoretical high side condition. In step 340, the head pressure control program 300 determines a control output using a control algorithm. By using the control algorithm, the head pressure control program calculates a control output as a function of the high side difference. In some examples of operating conditions that may be compared by the head pressure control program 300 include, but are not limited to: fan speed, whether a fan is operating, valve setting adjustments, etc. In some embodiments, the head pressure control program 300 may perform operations to try and cause the high side operating condition to move closer to the theoretical high side condition. In an example, if the high side operating condition is above the theoretical high side operating condition, the head pressure control program 300 may perform operations that cause the operating condition to lower towards the theoretical high side operating condition. In an example, if the high side operating condition is below the theoretical high side operating condition, the head pressure control program 300 may perform operations that cause the operating condition to raise towards the theoretical high side operating condition. In step 350, the head pressure control program 300 communicates the control output to one or more control devices via the network. In exemplary embodiments, once the head pressure control program 300 communicates the control output, the head pressure control program returns to step 310 and repeats the aforementioned steps during operation of the vapor compression system.

Figure 14:
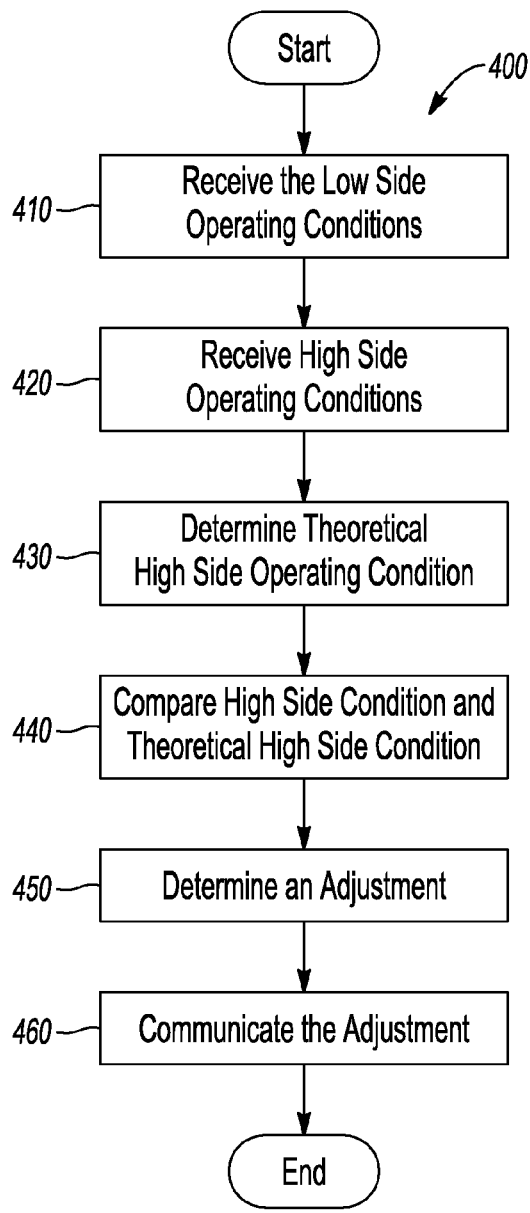
FIG. 14 depicts a flowchart for an exemplary embodiment of a method for controlling the high side condition of a vapor compression system.

The present disclosure may also be expressed as a method for controlling the head pressure of a vapor compression system. FIG. 14 depicts an exemplary embodiment of a head pressure control program 400 to control the head pressure of a vapor compression system. In step 410, the head pressure control program receives the low side operating conditions. In exemplary embodiments, the low side operating conditions are measured in the low side of the vapor compression system by a low side condition sensor 232. In exemplary embodiments, step 410 may be accomplished by any of the previously described devices and at any of the aforementioned locations in the low side of the vapor compression system. In an example, the low side condition sensor 232 associated with the low side of the vapor compression system measures the low side operating condition and communicates the low side operating condition to controller 240 through network 242. In step 420, the head pressure control program receives the high side operating conditions. In exemplary embodiments, the high side operating conditions are measured in the high side of the vapor compression system by a high side condition sensor 230. In exemplary embodiments, step 420 may be accomplished by any of the preciously described devices and at any of the aforementioned locations in the high side of the vapor compression system. In an example, the high side condition sensor 230 associated with the high side of the vapor compression system measures the high side operating condition and communicates the high side operating condition to controller 240 through network 242.

In step 430, the head pressure control program 400 determines a theoretical high side operating condition. In exemplary embodiments, the theoretical high side operating condition may be determined by looking up it up in a look-up table containing information correlating the theoretical high side operating condition to the low side operating condition measured in the measuring step 410. In some embodiments, the look-up table may contain information substantially similar to a bottom profile of a compressor operating envelope for a specific working fluid. In other embodiments, the look-up table may contain information substantially similar to a generic bottom profile that may be suitable for a plurality of specific working fluids. In other embodiments, the look-up table may contain a constant minimum condensing condition. In other embodiments, the look-up table may contain a minimum operating condition differential, which may be a linear correlation of the bottom profile of the operating envelopes for one or more specific working fluids. The high side operating condition may also be calculated using one or more formulas, functions, or algorithms. In some embodiments, the head pressure control program 400 may determine that the calculated theoretical high side operating condition is below a threshold value. Therefore, the head pressure operating control program 400 may determine that theoretical high side operating condition may not go below this predetermined threshold value.

In step 440, the head pressure control program 400 compares the difference between the theoretical high side operating condition and the high side operating condition measured in step 420. The result of the comparison of the theoretical high side operating condition and the high side operating condition measured by in step 420 may be a difference between the theoretical high side operating condition and the high side operating condition. In step 450, the head pressure control program 400 determines an adjustment that may be made to the vapor compression system to move the high side operating condition closer to the theoretical high side operating position by comparing the difference between the theoretical high side operating condition and high side operating condition resulting from step 440. In some embodiments, the adjustment resulting from step 440 may be in the form of a control output that may be communicated to a control device configured to influence the high side condition of the vapor compression system. In an example, the head pressure control program 400 may send a communication through network 242 to control device 248 that includes a form of a control output that is configured to influence the high side condition of the vapor compression system, such as, but not limited to influencing performance factors related to the high side.

In step 460, the adjustment resulting from step 450 may be implemented in the vapor compression system to influence the high side operating condition closer to the theoretical high side operating condition. The adjustment in step 460 may be accomplished by one or more control devices disposed in the high side of the vapor compression system such that the control devices may influence the high side operating condition. The control devices may be any of the previously described devices or any other suitable control device.

In exemplary embodiments, the steps of the head pressure control program 400 may be repeated at a pre-determined interval for on-going control of the vapor compression system. In other exemplary embodiment, the steps of the head pressure control program 400 may be perpetual during operation of the vapor compression system.

Figure 15:
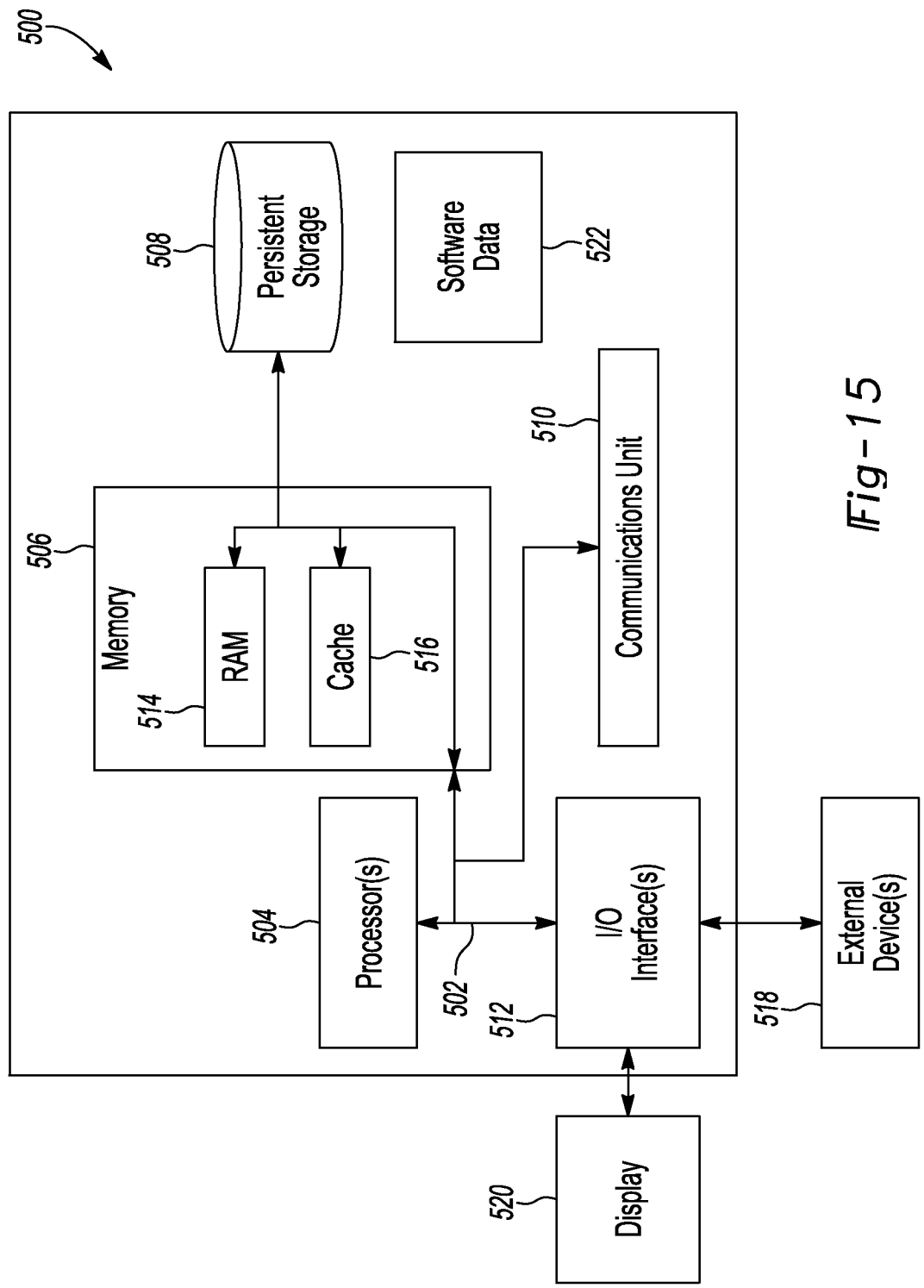
FIG. 15 depicts a schematic of a block diagram of the controller executing the head pressure control program, in accordance with an exemplary embodiment of the present disclosure.

FIG. 15 depicts a block diagram of components of the controller 500 for the head pressure control system in accordance with an illustrative embodiment of the present disclosure. It should be appreciated that FIG. 15 provides only an illustration of one implementation and does not imply any limitations with regard to the environments in which different embodiments may be implemented. Many modifications to the depicted environment may be made.

Controller 500 includes communications fabric 502, which provides communications between controller processor(s) 504, memory 506, persistent storage 508, communications unit 510, and input/output (I/O) interface(s) 512. Communications fabric 502 can be implemented with any architecture designed for passing data and/or control information between processors (microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

The head pressure control program 300 and/or head pressure control program 400 are stored in persistent storage 508 for execution by one or more of the respective computer processors 504 via one or more modules of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including the high side condition sensor, low side condition sensor, and control device. In these examples, communications unit 510 includes one or more network interface cards. Communications unit 510 may provide communications through the use of either or both physical and wireless communications links. The head pressure control program 300 may be downloaded to persistent storage 508 through communications unit 510.

I/O interface(s) 512 allows for input and output of data with other devices that may be connected to the controller 502. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present disclosure, e.g., the head pressure control program 300, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In this application, the term "controller" may be replaced with the term "circuit." The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; memory circuit (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart elements and descriptions above serve as software specifications, which can be translated into the computer programs by the routine work of a skilled technician or programmer.

The foregoing description of examples and embodiments is intended to illustrate and describe the subject matter of this disclosure and is not intended to be an exhaustive treatment or intended to limit the disclosure. Elements and features of particular embodiments may not be limited to that embodiment but may be interchangeable and may be used in other embodiments even if not specifically identified in those embodiments. Particular embodiments may also be varied by the inclusion of elements and features from other embodiments and are not intended to be limited to the elements specifically identified. Such variations are intended to be included within the scope of this disclosure and are not to be considered as a departure from the disclosed subject matter.

What is claimed is:

1. A system for controlling the head pressure of a vapor compression circuit, the system comprising:
a low side condition sensor disposed in a low side of the vapor compression circuit; wherein the low side condition sensor measures a low side operating condition;
a high side condition sensor disposed in a high side of the vapor compression circuit; wherein the high side condition sensor measures a high side operating condition;
a storage device storing information describing a compressor operating envelope;
a control device influencing the high side operating condition; and
a controller in communication with the low side condition sensor, the high side condition sensor, the storage device and the control device; the controller determining a theoretical high side operating condition using the information stored in the storage device, comparing the high side operating condition to the theoretical high side operating condition, determining a control output, and communicating the control output to the control device.

2. The system of claim 1 wherein the information describes a bottom profile of the operating envelope.

3. The system of claim 2 wherein the information comprises one or more functions that describe the bottom profile of the operating envelope.

4. The system of claim 2 wherein the information comprises one or more look-up tables that describe the bottom profile of the operating envelope.

5. The system of claim 4 wherein the information comprises a single look-up table that describes the bottom profile of the operating envelope, the operating envelope corresponding to a specific working fluid.

6. The system of claim 4 wherein the information comprises a plurality of look-up tables; wherein each of the plurality of look-up tables describes the bottom profile corresponding to one of a plurality of specific working fluids.

7. The system of claim 4 wherein the information comprises one or more look-up tables that describe a one or more generic bottom profiles; wherein each of the one or more generic bottom profile is suitable for one or more working fluids.

8. The system of claim 7 wherein the information comprises a single look-up table that describes a single generic bottom profile; wherein the generic bottom profile is suitable for one or more working fluids.

9. The system of claim 4 wherein the information comprises one or more look-up tables and a minimum condensing condition; wherein each of the one or more look-up tables describes the bottom profile of one or more working fluids and the minimum condensing condition is a constant.

10. The system of claim 4 wherein the information comprises a plurality of look-up tables; wherein one or more look-up tables describe a minimum differential function; wherein the minimum differential function models a plurality of bottom profiles for a plurality of working fluids.

11. The system of claim 1 wherein the high side condition sensor is a pressure transducer disposed in the condenser.

12. The system of claim 11 wherein the low side condition sensor is a pressure transducer disposed in the evaporator.

13. The system of claim 11 wherein the low side condition sensor is a pressure transducer disposed proximal to a compressor inlet.

14. The system of claim 1 wherein the high side condition sensor is a temperature transducer disposed in the condenser.

15. The system of claim 2 wherein the control device is selected from the group consisting of one or more condenser fans, one or more compressor electronics, one or more control valves disposed in the high side, and combinations thereof.

16. The system of claim 15 wherein the control device is one or more condenser fans.

17. The system of claim 15 wherein the control device is one or more compressor control electronics.

18. A head pressure control method for a vapor compression system, the head pressure control method comprising the steps of:
measuring a low side operating condition using a low side condition sensor;
communicating the low side operating condition to a controller via a network;
measuring a high side operating condition using the high side condition sensor;
communicating the high side operating condition to the controller via the network;
determining, by the controller consulting a computer readable memory storage device, a theoretical high side operating condition;
comparing, by the controller, the theoretical high side operating condition to the high side operating condition;
determining, by a controller, a control output; and
communicating the control output to one or more control devices.

19. The method of claim 18 wherein the computer readable medium stores a lookup table containing compressor performance envelope data; wherein the determining step further comprises a controller finding the theoretical high side condition corresponding to the low side condition.

20. The method of claim 19 wherein the lookup table is specific to a particular working fluid.

21. The method of claim 19 wherein the lookup table comprises a generic map suitable for a plurality of working fluids.

22. The method of claim 19 wherein the one or more lookup tables further comprises an alternate map and a default map; wherein the default map is suitable for a broad range of refrigerants; and wherein the alternate map is for a specific refrigerant.

23. The method of claim 19 wherein the one or more lookup tables comprises a generic map and a minimum condensing pressure set point.

24. The method of claim 19 wherein the one or more lookup tables comprises a generic map and a min differential line.

25. The method of claim 18 wherein the computer readable medium stores a formula for a range of specific refrigerants; and wherein the controller retrieves the formula from the computer readable medium and calculates the theoretical high side condition.

* * * * *